United States Patent [19]

Neuray et al.

[11] 3,957,728

[45] May 18, 1976

[54] POLYCARBONATES

[75] Inventors: Dieter Neuray, Rumeln-Kaldenhausen; Hugo Vernaleken, Krefeld; Hans Rudolph, Krefeld-Bockum, all of Germany

[73] Assignee: Bayer Aktiengesellschaft, Leverkusen, Germany

[22] Filed: Sept. 16, 1974

[21] Appl. No.: 506,158

Related U.S. Application Data

[63] Continuation-in-part of Ser. No. 397,502, Sept. 14, 1973, Pat. No. 3,894,991.

[30] Foreign Application Priority Data

Sept. 18, 1973 Germany............................ 2346935

[52] U.S. Cl. .............................. 260/47 XA; 210/24; 210/41; 210/500 R; 260/47 UA; 260/49; 260/850
[51] Int. Cl.² .................... C08G 63/62; B01D 15/08
[58] Field of Search ............. 260/47 XA, 47 UD, 49

[56] References Cited

UNITED STATES PATENTS

| 3,541,049 | 11/1970 | Cleveland ...................... 260/47 XA |
| 3,839,447 | 10/1974 | Swiger et al. .................. 260/47 XA |

*Primary Examiner*—Wilbert J. Briggs, Sr.
*Attorney, Agent, or Firm*—Lawrence S. Pope; Gene Harsh

[57] ABSTRACT

Polycarbonates are provided based on aromatic bis-hydroxy compounds which contain s-triazine compounds as linking members between 2 mols of the aromatic bis-hydroxy compounds bonded in each case via an oxygen atom thereof, on the one hand, and via carbon atoms of the s-triazine ring, on the other, the s-triazine rings carrying, on at least one further carbon atom, organic radicals with functional groups, these radicals being bonded via oxygen, nitrogen or sulphur. The novel polycarbonates may be used as selective solvents for hydrocarbons mixed with water or for making resins or coatings.

24 Claims, No Drawings

POLYCARBONATES

This application is a continuation-in-part of U.S. application Ser. No. 397,502, filed Sept. 14, 1973, now U.S. Pat. No. 3,894,991.

This invention relates generally to polycarbonate plastics and more particularly to polycarbonates containing one or more s-triazine rings.

It has been proposed before, for example, in U.S. Pat. Nos. 3,028,365 and 3,062,781, to make aromatic polycarbonates by reacting a bis-(hydroxyaryl)-alkane such as bis-phenol A with a carbonic acid derivative such as phosgene, a carbonic acid diester of chloro-carbonic acid ester of a di(monohydroxyaryl) alkane. It has also been proposed to include other reactive compounds in the reaction mixture to modify the properties of the polycarbonate. For example, it has been proposed by us in our application Ser. No. 397,502 filed Sept. 14, 1973, to make polycarbonates which contain s-triazine rings to increase the glass transition temperature, to increase the stability of the polycarbonate against saponification and to improve its burning characteristics.

It is an object of the invention to provide novel polycarbonates adapted to be used for the separation of hydrocarbons from water. Another object of the invention is to provide novel polycarbonates containing substituted s-triazine rings in their structure and a method for making the novel polycarbonates. A still further object of the invention is to provide a process for separating a hydrocarbon from water with the novel polycarbonate.

The foregoing objects and others are accomplished in accordance with this invention, generally speaking, by providing a polycarbonate plastic containing recurring units of the reaction product of two moles of an aromatic bis-hydroxy compound such as bis-phenol A with one mole of a compound having one or more s-triazine rings substituted with a carboxyl group, ester group, amide group, an aliphatically bonded hydroxyl group, sulphonic acid group or amidized sulphonic acid group bonded to a carbon atom of the ring through oxygen, nitrogen or sulphur, the recurring units being bonded together by

groups.

The present invention provides polycarbonates based on aromatic bis-hydroxy compounds, preferably based on bis-(hydroxyphenyl)-alkanes, which contain s-triazine compounds as linking members between 2 molecules of the aromatic bis-hydroxy compound, bonded in each case via an oxygen atom thereof, on the one hand, and via carbon atoms of the s-triazine rings, on the other, the s-triazine rings carrying, on at least one other carbon atom, organic radicals with functional groups, these radicals being bonded via oxygen, nitrogen or sulphur.

By functional groups as used herein and in the claims is meant acid group, modified acid groups, such as ester or amide groups, aliphatic hydroxyl groups, and especially carboxyl groups, esterified or amidized carboxyl groups, sulphonic acid groups, amidized sulphonic acid groups and aliphatically bonded hydroxyl groups. Organic radicals which have carboxyl groups or aliphatically bonded hydroxyl groups and are linked via nitrogen are preferred.

The s-triazine compounds can contain one or two s-triazine rings; in the s-triazine compounds with two s-triazine rings, these rings are linked via organic radicals which can carry functional groups, and these organic radicals can be linked via oxygen or sulphur, but preferably via nitrogen, to one carbon atom of each of two triazine rings.

The invention further provides a process for the preparation of the novel polycarbonates, according to which the aromatic bis-hydroxy compounds, which are modified with s-triazine compounds containing functional groups, are converted, by themselves, or with conjoint use of correspondingly unmodified aromatic bis-hydroxy compounds, into a polycarbonate according to processes which are in themselves known, with the aid of phosgene or other polycarbonate-forming derivatives of carbonic acid.

The invention also relates to the use of the new polycarbonates as absorbents.

The polycarbonates according to the invention can contain s-triazine rings of the following general formula

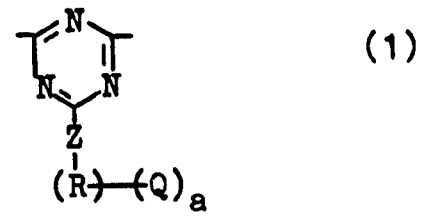

in which

Z represents -O-, -S-, NH- or -NR$^1$- or -N-(R*)$-$(Q*)$_{a*}$, R and R* are identical or not identical and denote alkylene radicals with 1 - 20 carbon atoms, cycloalkylene radicals with 5-12 carbon atoms, mononuclear or polynuclear arylene radicals, or heteroarylene radicals bonded via carbon, with up to 14 carbon atoms, monosubstituted or polysubstituted mononuclear or polynuclear arylene radicals, or heteroarylene radicals bonded via carbon, with up to 14 ring carbon atoms, possible substituents being, for example, alkyl, alkoxy, or alkylmercapto groups with 1–4 carbon atoms, halogen atoms, such as chlorine or bromine, -NO$_2$ or -CN, alkylarylene radicals with a total of up to 30 carbon atoms, or aralkylene radicals with a total of up to 30 carbon atoms, R$^1$ denotes alkyl radicals with 1 to 20 carbon atoms, cycloalkyl radicals with 5 to 12 carbon atoms, mononuclear or polynuclear, unsubstituted or substituted aryl radicals, or heteroaryl radicals bonded via carbon, with up to 14 ring carbon atoms, possible substituents being, for example, alkyl, alkoxy or alkylmercapto groups with 1 to 4 carbon atoms, halogen atoms, such as, for example, chlorine or bromine, -NO$_2$ or -CN, alkylaryl radicals with a total of up to 30 carbon atoms, aralkyl radicals with a total of up to 30 carbon atoms, or hydroxyalkyl radicals with 1 to 10 carbon atoms, Q and Q* are identical or not identical and denote a -COOH, -COOR², -CONR³R⁴, -SO₃H, -SO₂NR³R⁴ or aliphatically bonded -OH group, R² represents alkyl groups with 1–4 carbon atoms, R³ and R⁴ independently of one another represent hydrogen, straight-chain or branched alkyl groups with 1–4 carbon atoms or an unsubstituted, monosubstituted or polysubstituted phenyl radical or conjointly with the N atom form a 5-membered or 6-membered ring system and a and a* are identical or not identical and denote an integer from 1 to 4, as linking members between the aromatic bis-hydroxy compounds, and bonded via the oxygen atoms of the latter. Instead of the radicals, or additionally to the radicals, of the general formula 1, the polycarbonates according to the invention can contain radicals of the general formula 2

$R^5$ and $R^6$ = independently of one another, hydrogen, hydroxalkyl with 2–4 carbon atoms, alkyl with 1–4 carbon atoms, phenyl and sulphoxyphenyl.

The new polycarbonates containing s-triazine rings may consist essentially of identical or non-identical structural units of the following general formulae 3 and/or 4

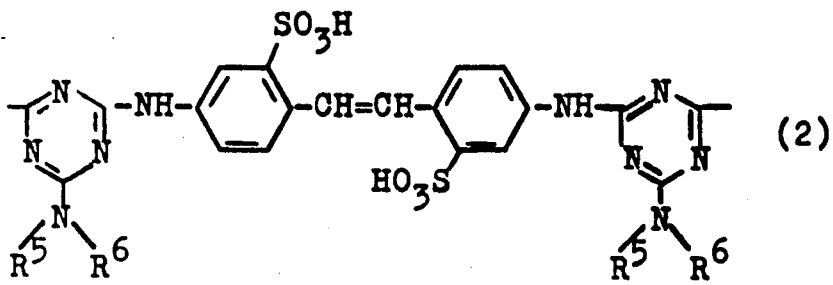

or in which $R^5$ and $R^6$ independently of one another represent H or alkyl, hydroxyalkyl, carboxyalkyl or alkoxycarbonylalkyl groups containing 1–5 carbon atoms, cycloalkyl groups containing 5 to 7 carbon atoms, or substituted or unsubstituted aryl groups containing 6 to 14 carbon atoms or conjointly with the N atom form a 5-membered or 6-membered ring system, such as that of pyrrolidine, piperidine or morpholine as linking members between the aromatic bis-hydroxy compounds and bonded via the oxygen atoms of the latter.

Preferred substituents of the stated formulae 1 and 2 are:

Z = -NH- or -NR¹-, or $$-\underset{|}{N}-(R^*)-(Q^*)_{a^*}$$

R and R* are identical or not identical and denote alkylene with 1 – 10 carbon atoms or phenylene, Q and Q* are identical or not identical and denote -COOH, -SO₃H or aliphatically bonded hydroxyl groups, R₁ = alkyl with 1–6 carbon atoms or hydroxyalkyl with 1–6 carbon atoms and in which X denotes an o-, m- or p-phenylene radical or a monosubstituted or polysubstituted o-, m- or p-phenylene radical, wherein possible substituents are, for example, lower alkyl groups with 1–4 carbon atoms or halogen atoms, such as chlorine or bromine, or preferably denotes a radical characterized by the formula 5 in which $R^7$ and $R^8$ represent hydrogen atoms, alkyl radicals with 1–4 carbon atoms or halogen atoms, among the latter preferably chlorine or bromine atoms, and have identical or different meanings, and Y denotes a single bond, an alkylene or alkylidene radical with 1–7 carbon atoms, a cycloalkylene or cycloalkylidene radical with 5 to 12 carbon atoms, -O-, -S-, -Co-, -SO-, $SO_2$- or a radical of the formula 6a or 6b

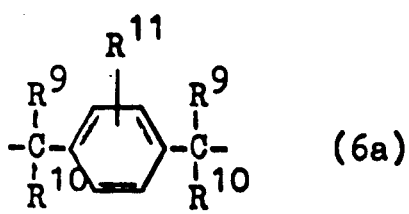

(6a)

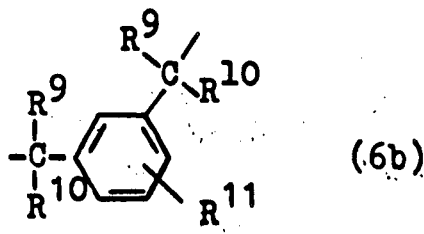

(6b)

wherein
  $R^9$ to $R^{11}$ denote alkyl radicals with 1–4 carbon atoms and
  $R^{11}$ can also represent hydrogen or halogen atoms, such as chlorine or bromine.
  Z, R, Q, a, $R^5$ and $R^6$ have the same meaning as indicated under the formulae 1 and 2 and
  n is a number between 1 and 200, preferably between 3 and 100.

Preferred Y radicals are the isopropylidene radical and the cyclohexylidene radical.

The mean weight average molecular weight ($M_w$) of the polycarbonates, determined by the light scattering method, is generally above 10,000 and preferably between 20,000 and 200,000. Of course, polycarbonates, containing s-triazine rings, with lower molecular weights can also be prepared.

The end groups of the new polycarbonates do not have a decisive influence on the properties of the products. For the sake of completeness, the following may be mentioned as end groups A for the left-hand side of the structural formulae 3 and 4 and as end groups B for the right-hand side:

A in 3 and 4 may represent H or -CO-$OR^{12}$,
·wherein
  $R^{12}$ denotes a phenyl radical or a monosubstituted or polysubstituted phenyl radical,
A in 3 may additionally represent a radical of the general formula 7

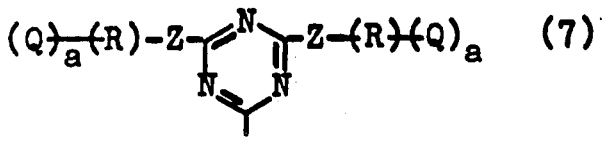
(7)

wherein
  Z, R, Q and a have the abovementioned meaning, and B represents -$OR^{12}$,
wherein
  $R^{12}$ has the abovementioned meaning.

Polycarbonates containing s-triazine rings and possessing functional groups were not previously known.

The new polycarbonates according to the invention are distinguished, in particular, in that as a result of the incorporation of the s-triazine structural units of the formulae 1 or 2 via the substituent Q in the formula 1 or via the sulpho group and/or via the radicals $R^5$ and $R^6$ in the formula 2, they are suitable for polymer-analogous reactions.

Polycarbonates with structural units of the formula 3, in which
  Q represents -COOH or -$SO_3$H
surprisingly disply absorbing properties for organic solvents if they are insoluble in the customary solvents for polycarbonates. This property of these modified polycarbonates can be varied widely through the nature and proportion of triazine segments, on the one hand, or through changing the molecular weight, on the other. In general, properties of triazine of the formula 1 of less than 15 mol-%, preferably between 10 mol-% and 1 mol-%, relative to the structural units of the formula 3, are necessary to achieve the desired effect. The insolubility of these polycarbonates can be controlled, inter alia, through incorporation of branching agents or cross-king agents. For example, with such products it is possible to remove hydrocarbons almost quantitatively from mixtures thereof with water, or solutions thereof in water. Examples of such hydrocarbons are aliphatic or aromatic hydrocarbons such as methylene chloride, chlorobenzene, benzene or xylene. Such utility of the products of this invention is of great importance for the purification of industrial effluents by removing hydrocarbons therefrom.

The invention therefore, contemplates the use of polycarbonates, containing s-triazine rings, of the formula 3 in which
  Q denotes -COOH or -$SO_3$H and
  Z, R, a, X and n have the abovementioned meaning for the absorptive removal of aliphatic, cycloaliphatic, aromatic and halogenated hydrocarbons from mixtures or solutions of these hydrocarbons with, or in, water or aqueous solutions containing inorganic salts.

Another embodiment of the invention contemplates the use of polycarbonates, containing s-triazine rings, of formula 3, in which
  Z represents NH,
  Q represents -COOH,
  a represents 1,
  X denotes 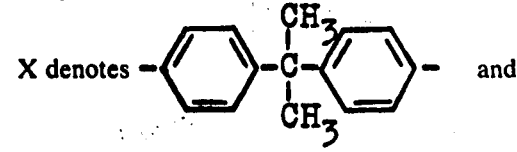 and R has the abovementioned meaning for the absorptive removal of aliphatic, cycloaliphatic, aromatic or halogenated hydrocarbons from mixtures or solutions of these hydrocarbons with, or in, water or aqueous solutions containing inorganic salts.

High molecular polycarbonates provided by the invention, containing s-triazine rings, can be prepared by first reacting dihalogeno-s-triazines of the formula 8

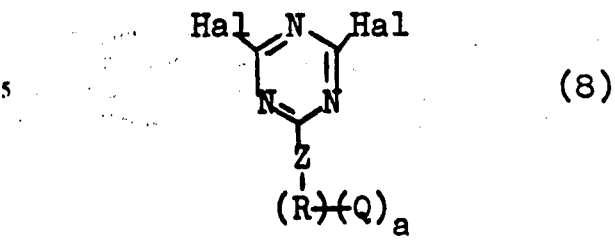
(8)

wherein

Hal denotes F, Cl, Br and I, but preferably Cl, and
Z, R, Q and a have the abovementioned meaning or
dichloro-bis-triazinyl compounds of the formula 9 ester of the aromatic dihydroxy compounds 10 and/or
oligomeric carbonates obtainable from 10 and containing chlorocarbonic acid ester end groups, according to
known methods for preparation of polycarbonates,

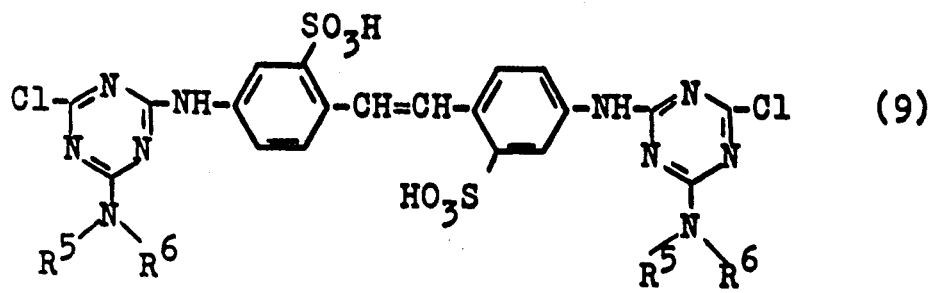

(9)

wherein

R⁵ und R⁶ have the abovementioned meaning with 2
to 201 equivalents of an aromatic dihydroxy compound of the formula 10

wherein

X has the abovementioned meaning in the presence
of a proton acceptor or, preferably, with 2 to 201
equivalents of the alkali metal salts of an aromatic
dihydroxy compound of the formula 10, according to
customary processes for the preparation of trisubstituted s-triazines, either (a) in an organic solvent which is
inert to the reactants 8, 9 and 10, or (b) in an aqueous
alkaline medium or (c) in a one-phase or two-phase
mixture of an organic solvent which is inert towards the
reactants and an aqueous alkaline phase, at temperatures between 0° and 300°C, preferably between 30°
and 150°C, using reaction times of between 0.2 and 20
hours, and then reacting the aromatic dihydroxy compounds of the formulae 11 and 12, containing s-triazine
rings, or their alkali metal salts preferably the phase boundary polycondensation
method, with the sum of the equivalents of the dihydroxy compound 10, employed as such and/or as its
alkali metal salts and/or as its bis-chlorocarbonic acid
ester and/or as oligomeric carbonates, prepared from
the dihydroxy compound 10 and containing chlorocarbonic acid ester end groups, not exceeding 201 equivalents per equivalent of the compounds 8 or 9, and with
at least 1.05 chlorine equivalents bonded via -CObeing employed per phenolic OH equivalent.

It is possible to react, alongside one another, different dihalogeno-s-triazines of formula 8 and/or different
bis-triazinyl-dichloro compounds of formula 9 and/or
mixtures of compounds of formulae 8 and 9 and/or different aromatic dihydroxy compounds of formula 10, if
a corresponding carbonate copolymer is desired. Furthermore, it is possible, without difficulty, to react the
reaction products of formulae 8 and 9 with an aromatic
dihydroxy compound with other aromatic dihydroxy
compounds and the abovementioned polycarbonateforming compounds.

The process according to the invention is distin-

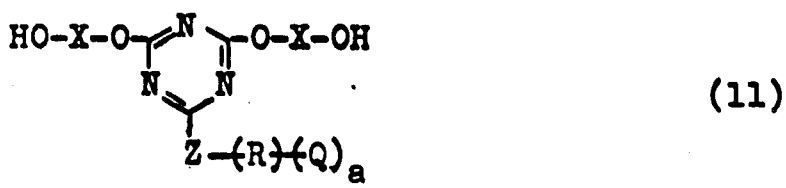

(11)

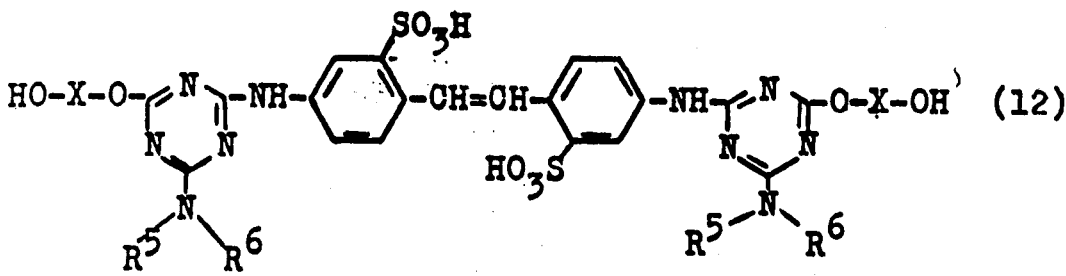

(12)

where are formed as intermediates, depending on the
choice of the molar ratio employed in the reaction of 8
or 9 with 10, either by themselves or mixed with further
10, with phosgene and/or a bis-chlorocarbonic acid guished in that the preparation of the bis-hydroxy compounds of formula 11 and/or formula 12 containing
s-triazine structures and the subsequent preparation of
the polycarbonates based on formulae 11 and/or 12 and optionally other dihydroxy compounds can be carried out in the same reaction medium and in the same reaction vessel without isolating the intermediate stages represented by formula 11 or 12. While separate preparation of the bisphenols containing s-triazine is possible, it is not necessary.

A further particular advantage of the process for the preparation of the polycarbonates of the formula 3 containing s-triazine structures is that instead of the purified dihalogeno-s-triazines of formula 8 it is also possible to employ solutions or suspensions of unpurified dihalogeno-s-triazines, obtained from the reaction of trihalogeno-s-triazines, preferably cyanuric chloride, with nucleophilic compounds of the formula 13

in which

Z, R, Q and a have the abovementioned meaning as described for formula 1, in a manner which is in itself known, directly for the further condensation with aromatic dihydroxy compounds of formula 10.

A further variant of the preparation of the polycarbonates according to the invention is that the reaction of the dihalogeno-s-triazines of formula 8 and/or formula 9 with the bis-hydroxy compounds of formula 10 is carried out in the presence of 0.01 to 5 mol percent of a trihalogeno-s-triazine, based on the structural unit of the formulae 3 and/or 4, wherein Hal has the meaning indicated for 8 but preferably denotes Cl so that the reaction mixture also contains, as intermediate products, trifunctional hydroxy compounds of the formula 14

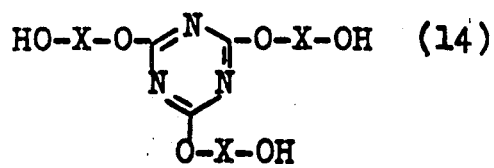

which on subsequent reaction with polycarbonate-forming compounds such as phosgene and/or bis-chlorocarbonic acid esters of bis-hydroxy compounds effect a branching of the polycarbonates via s-triazine rings.

Where they are not already known, the dihalogeno-s-triazines of formulae 8 and 9 used for the preparation of the homopolycarbonates or copolycarbonates according to the invention are prepared according to processes known from the chemical literature for preparing similar compounds.

The dichloro-s-triazines of the formula 8 in which

Hal denotes Cl are obtained, for example, by reaction of cyanuric chloride with aliphatic or aromatic amines, alcohols, phenols, mercaptans or thiophenols carrying functional groups Q [see, for example, J. R. Thurston et al., J. Am. Chem. Soc. 73, 2981 et seq. (1951); H. Koopman et al., Rec. trav. chim. Pays-Bas 78, 967 (1959); H. Koopman and J. Daams, Rec. trav. chim. Pays-Bas 77, 235 (1958); H. Nestler and H. Furst, J. prakt. Chem. [4] 22, 173 (1963); S. Horrobin, J. Chem. Soc. [London] 1963, 4130; DAS (German Published Specification) 1,176,319; DOS (German Offenlegungsschrift) 1 670 832]

The dichloro-bis-triazinylaminostilbene derivatives of the formula 9 are obtained, for example, by reaction of aminodichlorotriazine compounds with 4,4'-diaminostilbene-2,2'-disulphonic acid or its salts according to DOS (German Offenlegungsschrift) 1 670 832.

Examples of dihalogeno-s-triazines of the formula 8 which are suitable for the preparation of polycarbonates, containing s-triazine structures, of the formula 3, are the compounds obtainable by reacting cyanuric chloride in a manner which is in itself known, in the molar ratio 1:1 with hydroxyacetic acid, hydroxyacetic acid n-butyl ester, 2-hydroxypropionic acid (lactic acid), 2-hydroxypropionic acid ethyl ester, 2-hydroxysuccinic acid (malic acid), 2-hydroxypropane-1,2,3-tricarboxylic acid (citric acid), mercaptoacetic acid, 2-hydroxyethanesulphonic acid (isethionic acid), 2-aminoethanol, N-methylethanolamine, diethanolamine, 3-amino-1-propanol, 1-amino-2-propanol, diisopropanolamine, dihydroxytertiary butlamine, trihydroxy-tert.-butylamine, aminoacetic acid (glycine), methylaminoacetic acid, 3-aminopropionic acid, 4-aminobutyric acid, 6-aminohexanoic acid, 11-aminoundecanoic acid, aminosuccinic acid, 2-aminoglutaric acid, methionine, 2-aminoethanesulphonic acid (taurine), N-methylaminoethanesulphonic acid, 3-hydroxybenzoic acid, 3-hydroxybenzoic acid ethyl ester, 4-hydroxybenzoic acid, 4-mercaptobenzoic acid, 4-hydroxybenzoic acid methyl ester, 4-hydroxybenzoic acid propyl ester, 3-chloro-4-hydroxybenzoic acid, 4-hydroxyphthalic acid, phenol-3-sulphonic acid, phenol-4-sulphonic acid, 2,6-dichlorophenol-4-sulphonic acid, 1-naphthol-4-sulphonic acid, 1-naphthol-3,6-disulphonic acid, 2-naphthol-6-sulphonic acid, 2-naphthol-5,7-disulphonic acid, N-(2-hydroxyethyl)-cyclohexylamine, aminoacetic acid ethyl ester, 6-aminohexanoic acid ethyl ester, 2-hydroxypropionic acid methyl ester, 6-hydroxyhexanoic acid ethyl ester, mercaptoacetic acid methyl ester, mercaptosuccinic acid diethyl ester, 2-hydroxyethylaniline, anilinomethanesulphonic acid, anilinoacetic acid, hydroxyethyl-m-toluidine, m-toluidino-methanesulphonic acid, 2-aminobenzoic acid, 2-aminobenzamide, 3-aminobenzoic acid, 4-chloro-3-aminobenzoic acid, 4-chloro-3-aminobenzamide, 6-chloro-3-aminobenzoic acid, 5-nitro-3-aminobenzoic acid, 6-nitro-3-aminobenzoic acid, 4-aminobenzoic acid, 4-aminobenzoic acid ethyl ester, 4-aminobenzamide, 2-nitro-4-aminobenzoic acid, 4-amino-3-methylbenzamide, 3-amino-4-methylbenzoic acid, 5-aminoisophthalic acid, 4-aminonaphthalene-1,8-dicarboxylic acid, 3-amino-4-methoxybenzoic acid, aniline-2-sulphonic acid, aniline-3-sulphonic acid, aniline-3 -sulphonic acid amide, 3-aminobenzenesulphonic acid anilide, 3-aminobenzenesulphonic acid N-methylanilide, 6-chloroaniline-3-sulphonic acid, 4-chloroaniline-3-sulphonic acid, aniline-4-sulphonic acid, 4-aminobenzenesulphonic acid amide, diphenylamine-4-sulphonic acid, 4-benzylaminobenzenesulphonic acid, 2,5-dichloro-4-aminobenzenesulphonic acid, 4-aminotoluene-2-sulphonic acid, 4-aminotoluene-2-sulphonic acid anilide, 5-aminotoluene-2-sulphonic acid, 4-aminophenylmethanesulphonic acid, 4-aminoaphthalene-1-sulphonic acid, 5-aminonaphthalene-1-sulphonic acid, 6-aminonaphthalene-2-sulphonic acid, 8-aminonaphthalene-1,3,5-trisulphonic acid or 2-mercaptobenzothiazolesulphonic acid. Of course, numerous other dihalogene-s-triazines of formula 8 can also be used as starting compounds for the preparation of polycarbonates of the formula 3, containing s-triazine rings.

Examples of aminodichlorotriazine compounds of the formula 15

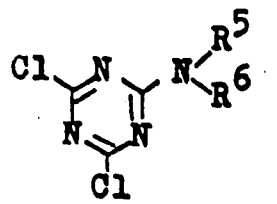

which can be reacted with 4,4'-diaminostilbene-2,2'-disulphonic acid or its salts to give dichloro-bis-triazinyl compounds of the formula 9, which are suitable for the preparation of polycarbonates of the formula 4 containing s-triazine structures, are the compounds obtainable by reacting cyanuric chloride with ammonia, methylamine, ethylamine or butylamine, dimethylamine, diethylamine or dipropylamine, monoethanolamine or diethanolamine, N-methylethanolamine, aminoacetic acid, 4-aminobutyric acid or 6-aminohexanoic acid, aminoacetic acid ethyl ester or β-aminopropionic acid ethyl ester, aniline, aniline-3-sulphonic acid, aniline-4-sulphonic acid or cyclohexylamine, pyrrolidine, piperadine or morpholine in a molar ratio of 1:1, in a manner which is in itself known.

Examples of suitable aromatic dihydroxy compounds of the formula 10 are hydroquinone, resorcinol, 4,4'-dihydroxydiphenyl, bis-(hydroxyphenyl)-alkanes, -cycloalkanes, -sulphides, -ethers, -ketones, -sulphoxides or -sulphones, and also α,α'-bis-(hydroxyphenyl)-diisopropylbenzenes and the corresponding nuclear-alkylated or nuclear-halogenated compounds.

Some preferred aromatic dihydroxy compounds are, for example: 2,2-bis-(4-hydroxyphenyl)-propane (bisphenol A), 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, bis-(4-hydroxyphenyl)-methane, 1,1-bis-(4-hydroxyphenyl)-cyclohexane and trinuclear bisphenols, such as α,α'-bis-(4-hydroxyphenyl)-p-diisopropylbenzene.

These and further bisphenols suitable for the preparation of the high molecular polycarbonates according to the invention are described in US-Pat. Nos. 2,970,131; 2,991,273; 2,999,835; 2,999,846; 3,014,891; 3,028,365; 3,062,781; 3,148,172; 3,271,367; 3,271,368 and 3,280,078 and in DT-OS 1,570,703, the disclosures of which are incorporated herein by reference.

Suitable agents for limiting the molecular weight are phenol and monosubstituted or polysubstituted phenols, but also monohalogeno-s-triazines of the general formula 16

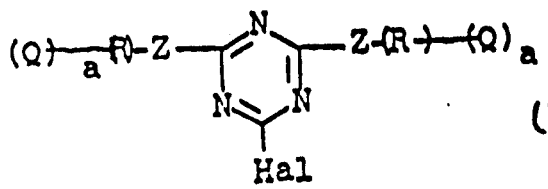

in which

Z, R, Q, a and Hal have the meaning already mentioned above for formula 8. These compounds arise as by-products in the preparation of the corresponding dihalogen derivatives.

The preparation of the polycarbonates according to the invention, containing s-triazine rings and comprising structural units of the formula 3 can, for example, be effected as follows:

First, the trihalogeno-s-triazine, for example, cyanuric chloride, is reacted with a nucleophilic compound of the formula 13 in a molar ratio of 1:1 in a manner which is in itself known, for example, in an aqueous medium in the presence or absence of organic solvents for the cyanuric chloride, such as, for example, acetone, methyl ethyl ketone or dioxane, with the addition of the stoichiometric amount of a proton acceptor, such as, for example, NaOH or KOH, which is necessary for the elimination of hydrogen chloride from cyanuric chloride and formula 13, on the one hand, and, if relevant, for the neutralization of, on the other hand, acid groups present in the compound of formula 13. The resulting dihalogeno-s-triazine of formula 8, is now either isolated from the reaction mixture and purified or is employed directly without further working up, as a solution or suspension in the solvents used in the reaction, in the subsequent reaction with an aromatic dihydroxy compound.

In a separate vessel, the aromatic dihydroxy compound and an alkali hydroxide, preferably sodium hydroxide or potassium hydroxide, in the molar ratio of 1:2, are dissolved in sufficient water to produce approximately a 10% strength aqueous alkali metal salt solution of the bisphenol. Water-insoluble or sparingly soluble alkali metal salts of dihydroxy compounds are employed as an aqueous suspension in the reaction. It is also possible to use, without disadvantage, more dilute or more concentrated alkali metal salt solutions or suspensions.

A solution or suspension of a dihalogeno-s-triazine which has been isolated and been purified by recrystallization, distillation or elution, or of a non-isolated dihalogeno-s-triazine, dissolved or suspended in water, in the presence or absence of an organic solvent such as, for example, acetone, methyl ethyl ketone or dioxane or of a water-immiscible organic solvent which is inert towards the dihalogenotriazine, is now added in portions, or as one portion, in the molar ratio of 20:1 to 2:1 to this aqueous alkali metal salt solution or suspension.

As inert organic solvents it is possible to use, for example, chlorinated hydrocarbons such as $CH_2Cl_2$, $CHCl_3$, $CCl_4$, ethylene chloride and trichloroethylene, benzene, toluene, xylenes, chlorobenzene, chlorotoluenes, dichlorobenzenes and more highly chlorinated aromatic compounds to prepare the suspension or solution of dihalogeno-s-triazine.

It is equally possible first to take the dichlorotriazine solution or suspension and to add the alkali metal salt solution or suspension of the bisphenol.

The well-stirred one-phase or two-phase mixture is now kept at a temperature between 0°C and 300°C, preferably between 30° and 150°C, for a period of 0.2 to 20 hours. If appropriate, the organic solvents, such as for example, acetone, which have been left from the reaction of cyanuric chloride with a compound of formula 13 are removed by distillation in the course of this reaction stage. As a rule, the condensation of the dichloro-s-triazine with the dihydroxy compound is complete not later than after 5 hours. The entire reaction up to this point is carried out under an inert gas atmosphere, for example, under nitrogen. The alkali salts of the bisphenols of the formula 11, containing s-triazine rings, which are formed, are more or less readily water-soluble, depending on the nature of the dihalogeno-s-triazine used and of the aromatic dihydroxy compound used, so that after the condensation has taken place, either a solution, an emulsion or a suspension is present, though this is not of decisive importance with regard to the formation of the polycarbonates according to the invention.

If it is desired to prevent the occurrence of side-reactions between the aromatic dihydroxy compound and two molecules of the dihalogeno-s-triazine with formation of intermediate products of the formula 17

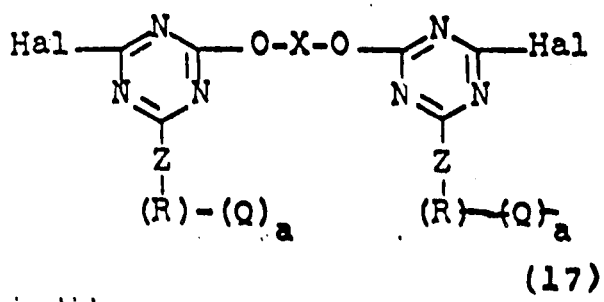

(17)

in which

X, Z, R, Q, a and Hal have the abovementioned meaning it is advantageous to choose a large excess of bisphenol and to effect both the addition of the dihalogeno-s-triazine and the condensation at an elevated temperature. However, the formation of the by-products of the formula 17 does not interfere with the overall course of the reaction since these compounds are also smoothly built into the polycarbonate structure.

If desired, a solvent suitable for aromatic polycarbonates, such as methylene chloride, chloroform, carbon tetrachloride and 1,2-dichloroethane, or chlorinated aromatics, such as dichlorobenzene, chlorotoluene or chlorobenzene, is also added to the one-phase or two-phase mixture in which the alkali metal salts of the aromatic dihydroxy compound, optionally employed in excess, and the alkali metal salts of the bisphenol of the formula 11, containing s-triazine structures, are dissolved or suspended, and after addition of the agent for limiting the molecular weight, already mentioned above, the reaction with compounds forming carbonate groups, such as carbonic acid derivatives, for example, phosgene, bis-chlorocarbonic acid esters or oligomeric carbonates obtainable from dihydroxy compounds and containing chlorocarbonic acid ester end groups, is carried out in a known manner as disclosed in the aforesaid patents in an alkaline medium at a pH value between 10 and 14, depending on the nature of the bisphenol component 10 which is used and of the bisphenol 11, containing s-triazine structures, which is used.

The polycarbonates containing s-triazine rings and prepared according to the two-phase boundary process, which either precipitate from the reaction mixture or are dissolved in the organic phase, are isolated in the usual manner, for example by acidifying the reaction mixture which reacts alkaline and filtering off the polycarbonate which precipitates and washing it with water until neutral, or precipitating the polycarbonate present in solution from the organic phase or evaporating the solution of the polycarbonate which has been washed until neutral.

The polymers thus obtained are low molecular or high molecular depending on the amount of chain stopper added.

When using dihalogeno-s-triazines of the formula 8, in which

Q denotes a -COOH, -SO$_3$H or aliphatic OH group it is also possible, if desired, to prepare, by the process described above, polycarbonates containing s-triazine rings branched or crosslinked via the -COOH, -SO$_3$H or aliphatic OH group, by carrying out the formation of the polycarbonate at a high pH value, preferably at a pH value >13.

The polycarbonates with structural units of the formula 4 are prepared analogously to the polycarbonates with structural units of the formula 3.

The new polycarbonates containing s-triazine rings, according to the invention, of the formula 3 and 4, are outstandingly suitable for polymer-analogous reactions by virtue of the incorporation of the s-triazine structural units of the formula 1 and 2, through the substituent Q in the formula 1 or through the SO$_3$H group or through the radicals R$^a$ and R$^b$ in the formula 2. For example, polycarbonates containing s-triazine structures and containing aliphatic OH groups can be crosslinked with aminoplastics or their defined intermediate products such as, for example, melamine resins, benzoguanamine resins or urea resins, phenolic resins or organic diisocyanates and polyisocyanates, to give hard coatings.

Polycarbonates of the formulae 3 and 4, containing ester groups and carboxyl groups, can be crosslinked, for example, with bis-oxazolines or diepoxide and polyepoxide compounds such as glycidyl esters to give hard coatings. The lacquers can optionally contain pigments and the customary lacquer auxiliaries.

Polycarbonates with structural units of the formula 3 in which

Q denotes a carboxyl or sulphoxyl group which are insoluble, at a certain molecular weight, in numerous organic solvents, are outstandingly suitable for the absorptive isolation or removal of aliphatic, cycloaliphatic, aromatic and halogenated hydrocarbons from aqueous solutions or mixtures with water.

In the examples which follow "hrs." denotes hours, "mins." denotes minutes and "Ex." denotes example.

EXAMPLE 1

Copolycarbonate from 2,2-bis-(4-hydroxyphenyl)-propane (bisphenol A) and 2-diethanolamino-4,6-dichloro-s-triazine (95:5 molar parts), with chain stopper.

1.27 g (5 mmols) of 2-diethanolamino-4,6-dichloro-s-triazine, suspended in 60 ml of chlorobenzene, and 0.2 g of NaBH$_4$, are added to a solution of 21.7 g (0.095 mol) of bisphenol A and 7.6 g (0.19 mol) of NaOH in 180 ml of water, while simultaneously passing in a gentle stream of nitrogen. The well-stirred two-phase mixture is heated to about 90°C for 4 hours. It is then allowed to cool to about 20°C, whereupon an intermediate product precipitates. After addition of 0.43 g (2.86 mmols) of p-tert.-butylphenol and 120 ml of CH$_2$Cl$_2$, the pH is adjusted to 11-12 with 10% strength hydrochloric acid and 13.4 g (0.135 mol) of COCl$_2$ are passed in over the course of about 30 minutes at 24°–27°C, while stirring vigorously. During the phosgenation, in the course of which the intermediate product dissolves, the pH value is kept between 11 and 12 by dropwise addition of 1 N NaOH solution. Afte addition of 5.5 ml of 1% strength aqueous triethylamine solution, the mixture is stirred for a further 10 minutes at pH 11-12, during which time the two-phase mixture becomes highly viscous. After acidification with dilute phosphoric acid, the organic phase is separated off, washed with distilled water until neutral and added dropwise to methanol, whereupon the polycarbonate precipitates as a white powder.

After drying for 17 hours at 100°C and 15 mm Hg, 21.4 g (86%) of polycarbonate containing s-triazine are obtained.

The relative viscosity (0.5 g of product in 100 ml of $CH_2Cl_2$ at 25°C) is 1.254. N content: calculated 1.12%, found 1.04% % aliphatic OH: calculated 0.68%, found 0.62%.

The polycarbonate obtained according to Example 1 is dissolved in chlorobenzene and crosslinked with toluylene diisocyanate at the boil. Hard products result, which precipitate from the reaction solution and are insoluble in organic solvents.

EXAMPLE 2

Copolycarbonate from bisphenol A and 2-diethanolamino-4,6-dichloro-s-triazine (78:22 molar parts) with chain stopper.

20.1 g (0.088 mol) of bisphenol A and 7.04 g (0.176 mol) of NaOH are dissolved in 180 ml of water under a $N_2$ atmosphere, with addition of 0.2 g of $NaBH_4$, and the solution is warmed to approx. 60°-70°C. A suspension of 6.27 g (24.8 mmols) of 2-diethanolamino-4,6-dichloro-s-triazine in 60 ml of chlorobenzene is added dropwise thereto and the reaction is allowed to take place for 2 hours at 80°-90°C while stirring vigorously. After cooling to room temperature, the pH is adjusted to 11 with dilute hydrochloric acid, 120 ml of $CH_2Cl_2$ and 1.315 g (8.75 mmols) of p-tert.-butylphenol are then added and the mixture is reacted with 9.3 g (0.094 mol) of $COCl_2$ at pH 11-12 in accordance with Example 1. After addition of 6.3 ml of 1% strength aqueous triethylamine solution, the mixture is stirred for a further hour at pH 11 and the polycarbonate is isolated by evaporating the organic phase which has been washed until neutral. Yield: 24.2 g (93%) of polycarbonate containing triazine $\eta_{rel}$ (0.5 g of product in 100 ml of $CH_2Cl_2$, 25°C): 1.078 N content: calculated 5.35%, found 4.96% OH number: calculated 107, found 91

The polycarbonate obtained in Example 2 can, for example, be stoved together with hexamethylolmelamine hexamethyl ether in m-cresol, in the presence of p-toluenesulphonic acid, at 200°C, to give hard coatings.

EXAMPLE 3

Crosslinked copolycarbonate from bisphenol A and 2-diethanolamino-4,6-dichloro-s-triazine (90:10 molar parts) with chain stopper.

Analogously to Example 1, 20.6 g (0.09 mol) of bisphenol A, 7.2 g (0.18 mol) of NaOH and 2.53 g (0.01 mol) of 2-diethanolamino-4,6-dichloro-s-triazine are reacted in a solvent mixture of 180 ml of water and 60 ml of chlorobenzene, with the addition of 0.09 g of $NaBH_4$, for 4 hours at the reflux temperature. After having cooled, 0.27 g (1.8 mmols) of p-tert.-butylphenol and 140 ml of $CH_2Cl_2$ are added, the pH is adjusted to 14 with 2 N NaOH solution and 11.9 g (0.12 mol) of $COCl_2$ are passed in at pH 14 with vigorous stirring. After the phosgenation, the aqueous phase is free of the bisphenolate salt. 4.9 ml of 1 percent strength aqueous triethylamine solution are then added and the mixture is condensed. After stirring for about 3 minutes longer, the mixture first becomes highly viscous and finally gums up to the point that further stirring no longer serves any purpose. The polycarbonate mass which has swollen like a gel is filtered off, repeatedly treated with dilute phosphoric acid and then rinsed with water.

After drying for 24 hours in a vacuum drying cabinet at 100°C, about 25 g of a hard viscous mass are obtained.

The product is insoluble in most organic solvents. N content: calculated 2.29%, found 2.20%.

EXAMPLE 4

Copolycarbonate from bisphenol A and N-(4,6-dichloro-s-triazine-2-yl)-p-aminobenzoic acid (90:10 molar parts).

2.85 g (0.01 mol) of N-(4,6-dichloro-s-triazine-2-yl)-p-aminobenzoic acid are added to a solution of 20.6 g (0.09 mol) of bisphenol A and 7.6 g (0.19 mol) of NaOH in 190 ml of water, 0.2 g of $NaBH_4$ also being added, and the mixture is heated to approx. 90°-95°C for 5 hours while stirring under a $N_2$ atmosphere. During the heating period, the dichloro-s-triazine dissolves. After cooling to 20°C, a clear solution is obtained. After adding 200 ml of $CH_2Cl_2$, the pH value is adjusted to 12 and the mixture is reacted with 11.9 g (0.12 mol) of $COCl_2$ at pH 12 as described under Example 1, whereupon a milky white, slightly viscous emulsions forms. The pH is then adjusted to 13, 8 ml of 1% strength aqueous triethylamine solution are added and the mixture is stirred for a further hour at pH 13.

After acidifying with dilute phosphoric acid, the mixture is twice extracted by shaking with distilled water and the entire two-phase mixture – since the two phases only separate very slowly — is then added dropwise to methanol whereupon the polycarbonate precipitates as a white powder. Yield: 24.7 g (100%) of polycarbonate containing triazine. N content: calculated 2.26%, found 2.22% % COOH: calculated 1.82%, found 1.7%.

The product is insoluble in the customary solvents for polycarbonate, such as, for example, $CH_2Cl_2$, tetrahydrofurane, dioxane and pyridine.

The N-(4,6-dichloro-s-triazine-2-yl)-p-aminobenzoic acid used was prepared as follows:

A suspension of 68.6 g (0.5 mol) of p-aminobenzoic acid and 50.6 g (0.5 mol) of triethylamine in 1,350 ml of acetone is introduced into a solution of 92.2 g (0.5 mol) of cyanuric chloride in 650 ml of acetone at 0°-5°C. The reaction temperature is allowed to rise to 20°C over the course of 90 minutes and the mixture is stirred for a further 90 minutes. The reaction product which precipitates is filtered off, washed with distilled water until free of chloride, extracted by boiling twice with acetone and dried at 50°C/15 mm Hg.

Yield: 114 g (80% of theory), melting point >300°C
Analysis: calculated C, 42.1%, H 2.11, N 19.65, Cl 24.95; found 41.7%, 2.17, 19.2, 24.7.

EXAMPLE 5

Copolycarbonate from bisphenol A and N-(4,6-dichloro-s-triazinyl-2)-p-aminobenzoic acid (89.5:10.5 molar parts).

18.3 g (0.08 mol) of bisphenol A, 7.2 g (0.18 mol) of NaOH and 5.7 g (0.02 mol) of N-(4,6-dichloro-s-triazinyl-2)-p-aminobenzoic acid in 320 ml of $H_2O$ are reacted for 5 hours at 90°-95°C, analogously to Example

4.

After cooling, a solution of 31.8 g (0.09 mol) of bisphenol A bis-chlorocarbonic acid ester in 620 ml of $CH_2Cl_2$ is allowed to run into the yellow solution of the sodium salts of the dihydroxy compounds over a period of 2 minutes, with vigorous stirring, 15.2 ml of 1% strength aqueous triethylamine solution are then added and the mixture is stirred further, while keeping the pH value of the aqueous solution at 12. The two-phase mixture becomes very viscous within a short time. After about 20 minutes, the reaction is discontinued since a white spongy gel precipitates and stirring no longer serves any purpose. The reaction mixture is acidified with dilute phosphoric acid and the gel formed is filtered off. The filtrate consists exclusively of the aqueous phase, the entire $CH_2Cl_2$ being absorbed by the polycarbonate containing triazine. The polycarbonate is washed until substantially neutral by suspending it in distilled water and is dried for 20 hours at 50°C/15 mm Hg.

Yield: 46.5 g (99%) of flocculent white polycarbonate containing triazine. N content: calculated 2.38%, found 2.25%.

The product is soluble in dimethylformamide (DMF). % COOH (in DMF): calculated 1.91%, found 1.70%.

EXAMPLE 6

Removal of hydrocarbons from aqueous solutions by absorption on a copolycarbonate from bisphenol A and N-(4,6-dichloro-s-triazinyl-2)-p-aminobenzoic acid (89.5:10.5 molar parts).

A 30 cm long column of internal diameter 1.5 cm is filled with 10 g of the copolycarbonate prepared in Example 5 (packing height of the very voluminous material: about 20 cm). Solutions of hydrocarbons in water, and salt solutions (50 ml in each case) are allowed to run successively through the column and the hydrocarbon content in the aqueous solution, before and after passage through the column, is determined by gas chromatography (see Table 1):

and the mixture is stirred further at pH 13. After about 10 minutes, the polycarbonate containing triazine precipitates as a jelly and is worked up as described under Example 5. Yield: 26.0 g (99%) of a white granular product N content: calculated 1.12%, found 1.02% COOH content: calculated 0.897%, found 0.899%

EXAMPLE 8

Copolycarbonate from bisphenol A and N-(4,6-dichloro-s-Triazinyl-2)-p-aminobenzoic acid (98:2 molar parts) with chain stopper. (a) Analogously to Example 5, 9.1 g (0.04 mol) of bisphenol A are reacted with 0.57 g (2 mmols) of N-(4,6-dichloro-s-triazinyl-2)-p-aminobenzoic acid and then condensed, in the presence of 383 mg (2.55 mmols) of p-tert.-butylphenol, with 21.2 g (0.06 mol) of bisphenol A bis-chlorocarbonic acid ester, with the addition of 10.1 ml of 1% strength aqueous triethylamine solution, at pH 12-13. After 10 minutes, the copolycarbonate precipitates as a jelly and is worked up as described above.

Yield: 25 g (97%) N content: calculated 0.439%, found 0.41% (b) If the reaction described under a) is carried out in the presence of 766 mg (5.11 mmols) of p-tert.-butylphenol, the polycarbonate remains dissolved in methylene chloride. After the addition of triethylamine, the mixture is stirred for a further hour at pH 12-13, the organic phase is washed until neutral and then evaporated, and the residue is dried for 65 hours at 100°C/15 mm Hg.

Yield: 22.2 g (86%) of copolycarbonate containing triazine. $\eta_{rel}$ (0.5 g of product in 100 ml of $CH_2Cl_2$, 25°C): 1.267 N content: calculated 0.434%, found 0.41% COOH content: calculated 0.349%, found 0.34%

EXAMPLE 9

Copolycarbonate from bisphenol A and N-(4,6-dichloro-s-triazinyl-2)-p-aminobenzoic acid (80:20 molar parts).

Analogously to Example 5, 10 g (0.044 mol) of bisphenol A, 8 g (0.2 mol) of NAOH and 5.7 g (0.02 mol)

Table 1 (accompanying Example 6):

| Solutions | Hydrocarbon content Before absorption [mg/l] | Hydrocarbon content After absorption [mg/l] | Separation effect [%] |
|---|---|---|---|
| $CH_2Cl_2$/distilled water | 11,000 | 30 | 99.7 |
| Chlorobenzene/distilled water | 120 | 1 | 99.2 |
| Benzene/distilled water | 110 | <5[a] | >94.5 |
| Xylene/distilled water | 30 | <1[a] | >96.7 |
| $CH_2Cl_2$/chlorobenzene/alkaline salt solution | 4,500 $CH_2Cl_2$ 50 Chlorobenzene | 50 <1 | 98.9 >98 |
| $CH_2Cl_2$/chlorobenzene/acid salt solution | 2,600 $CH_2Cl_2$ 10 Chlorobenzene | 10 <1 | 99.6 >90 |

[a]Limit of detectability

EXAMPLE 7

Copolycarbonate from bisphenol A and N-(4,6-dichloro-s-triazinyl-2)-p-aminobenzoic acid (95:5 molar parts) with chain stopper.

Analogously to Example 5, 9.1 g (0.04 mol) of bisphenol A are first reacted in alkaline solution with 1.5 g (5.26 mmols) of N-(4,6-dichloro-s-triazinyl-2)-p-aminobenzoic acid, 474.3 mg (3.16 mmols) of p-tert.-butylphenol are then added, a solution of 21.2 g (0.06 mol) of bisphenol-A bis-chloro-carbonic acid ester in 180 ml of $CH_2Cl_2$ is then allowed to run in, 10.1 ml of 1% strength aqueous triethylamine solution are added of N-(4,6-dichloro-s-triazinyl-2)-p-aminobenzoic acid are reacted in 250 ml of water and then condensed with 12.7 g (0.036 mol) of bisphenol A bis-chlorocarbonic acid ester in 230 ml of $CH_2Cl_2$ with the addition of 10.1 ml of a 1% strength aqueous triethylamine solution. 5 minutes after the addition of the triethylamine, the polycarbonate already precipitates as a jelly. After stirring for a further hour, the mixture is worked up as described above. The gel is washed until neutral and dried for 30 hours at 80°C/15 mm Hg.

Yield: 22 g (92%) of a white, finely granular powder N content: calculated 4.65%, found 4.48% COOH content: calculated 3.74%, found 2.96%

EXAMPLE 10

Copolycarbonate from bisphenol A and N-(4,6-dichloro-s-triazinyl-2)-p-aminobenzoic acid (90:10 molar parts), branched by means of cyanuric chloride.

Analogously to Example 4, 20.6 g (0.09 mol) of bisphenol A and 2.85 g (0.01 mol) of N-(4,6-dichloro-s-triazinyl-2)-p-aminobenzoic acid are dissolved in 190 ml of 1 N NaOH solution and a solution of 40.5 mg (0.22 mmols) of cyanuric chloride in 50 ml of dioxane is added. The mixture is heated to 90°–95°C for 5 hours while stirring under a $N_2$ atmosphere and is then cooled to 20°C, and the resulting clear solution is mixed with 150 ml of $CH_2Cl_2$ and then reacted with 11.9 g (0.2 mol) of $COCl_2$ at pH 12. After dilution with 150 ml of $CH_2Cl_2$, 8.3 ml of 1% strength aqueous triethylamine solution are added and the mixture is stirred for a further hour at pH 12–13. After acidifying with dilute phosphoric acid, the polycarbonate containing triazine precipitates as a gel and is worked up as described in Example 5.

Yield: 24 g (97%) of white flocculent product. N content: calculated 2.06%, found 2.08%.

EXAMPLE 11

Copolycarbonate from bisphenol A and N-(4,6-dichloro-s-triazinyl-2)-sulphanilic acid (90:10 molar parts).

20.6 g (0.09 mol) of bisphenol A, 7.2 g (0.18 mol) of NaOH and 3.43 g (0.01 mol) of the Na salt of N-(4,6-dichloro-s-triazinyl-2)-sulphanilic acid are reacted in accordance with Example 4, the mixture is then reacted with 11.9 g (0.12 mol) of $COCl_2$ at pH 12 and after addition of triethylamine the whole is stirred for a further hour at pH 13. On acidifying the reaction product, the copolycarbonate precipitates as a white powder which is filtered off, washed until neutral by suspending it in water, then rinsed with methanol and dried for 65 hours at 80°C/15 mm Hg.

Yield: 23.5 g (93%) of copolycarbonate N content: calculated 2.21%, found 2.16%.

EXAMPLE 12

Copolycarbonate from bisphenol A and N-(4,6-dichloro-s-triazinyl-2)-p-aminobenzoic acid ethyl ester (85.7:14.3 molar parts).

Analogously to Example 1, a solution of 20.6 g (0.09 mol) of bisphenol A and 7.2 g (0.18 mol) of NaOH in 180 ml of $H_2O$ is reacted for 3 hours at 80°–90°C with a suspension of 4.69 g (15 mmols) of N-(4,6-dichloro-s-triazinyl-2)-p-aminobenzoic acid ethyl ester in 60 ml of chlorobenzene. On cooling to room temperature, a gritty intermediate product precipitates. After addition of 120 ml of $CH_2Cl_2$, the pH is adjusted to 13 and the mixture is reacted with 11.9 g (0.12 mol) of $COCl_2$ at pH 13. After addition of 5 ml of 1% strength aqueous triethylamine solution the mixture is stirred further until the copolycarbonate precipitates as a gel after about 15 minutes. The precipitated product is worked up as described in Example 5.

Yield: 26 g (100%) of copolycarbonate containing triazine. N content: calculated 3.22%, found 3.15%

The IR spectrum (KBr pressing) shows unambiguously that the material is a polycarbonate containing ester groups. The product is soluble in dimethylformamide.

The N-(4,6-dichloro-s-triazinyl-2)-p-aminobenzoic acid ethyl ester used was prepared according to an instruction given by Thurston et al. (J. Am. Chem. Soc. 73, 2981 [1951]) for the preparation of 2-amino-dichloro-s-triazines by reaction of 0.5 mol of cyanuric chloride with 0.5 mol of p-aminobenzoic acid ester, with addition of 0.25 mol of $Na_2CO_3$, in acetone (200 ml)/dioxane (50 ml)/water (300 ml), at 0°–5°C. The dichlorotriazine which precipitates from the reaction mixture is purified by boiling with acetone.

Yield: 76%, melting point 294°–295°C Calculated: C, 46.05; H; 3.22, N 17.9, Cl 22.70, Found: 46.15, 3.13, 17.8, 22.6.

EXAMPLE 13

Copolycarbonate from bisphenol A and N-(4,6-dichloro-s-triazinyl-2)-glycine.

Following an instruction for the preparation of 2-amino-4,6-dichloro-s-triazines (J. Thurston et al., J. Am. Chem. Soc. 76, 2981 [1951]), 1.84 g (0.01 mol) of cyanuric chloride and 0.79 g (10.5 mmols) of glycine are reacted, with addition of 0.84 g (21 mmols) of NaOH, in acetone/$H_2O$ (7:11 parts by volume) at approx. 0°C and the mixture is stirred for a further hour and allowed to warm to room temperature. A solution of 9.6 g (42 mmols) of bisphenol A and 3.36 g (84 mmols) of NaOH in 42 ml of $H_2O$ is added to this orange-red colored solution of the dichlorotriazine in acetone/water and the mixture is gradually heated to about 90°–95°C, during which time the acetone is removed from the reaction solution by distillation. After removing the acetone, the mixture is stirred for a further 3 hours at 95°–100°C. It is then allowed to cool to room temperature, the light yellow solution is diluted with 100 ml of water, a solution of 16.96 g (48 mmols) of bisphenol A bis-chlorocarbonic acid ester is allowed to run in while stirring vigorously, 10.1 ml of 1% strength aqueous triethylamine solution are added and the mixture is stirred further at pH 13. After about 15 minutes, the polycarbonate precipitates as a jelly. The reaction is stopped and the polycarbonate is worked up as described in Example 5.

Yield: 22.3 g (93%) of a flocculent white copolycarbonate N content: calculated 2.32%, found 2.28% COOH content: calculated 1.87%, found 1.7%.

The product is able to absorb approx. 38 times its own weight of $CH_2Cl_2$.

EXAMPLE 14

Copolycarbonate from bisphenol A and N-(4,6-dichloro-s-triazinyl-2)-6-aminohexanoic acid (90:10 molar parts).

Analogously to Example 13, 1.84 g (0.01 mol) of cyanuric chloride are reacted with 1.38 g (10.5 mmols) of 6-amino-hexanoic acid to give N-(4,6-dichloro-s-triazinyl-2)-6-aminohexanoic acid, the resulting white suspension is condensed with 9.6 g (42 mmols) of bisphenol A, while distilling from the mixture the acetone originating from the first reaction stage, and the resulting colorless solution of the dihydroxy compounds is polycondensed at 20°–25°C with a solution of 16.96 g (48 mmols) of bisphenol A bis-chloro-carbonic acid ester in methylene chloride at pH 13 for 1 hour after having added 10.1 ml of 1% strength triethylamine solution. The organic phase is separated off, acidified with dilute phosphoric acid, washed until neutral and added dropwise to methanol, whereupon the polycarbonate containing triazine precipitates in a white flocculent form.

Yield: 21.4 g (87%) $\eta_{rel}$ (0.5 g of product in 100 ml of $CH_2Cl_2$, 25°C): 1.535 N content: calculated 2.27%, found 2.12% COOH content: calculated 1.62%, found 1.59%.

EXAMPLE 15

Copolycarbonate from bisphenol A and N-(4,6-dichloro-s-triazinyl-2)-2-aminobenzoic acid.

Analogously to Example 4, 9.6 g (42 mmols) of bisphenol A, 3.76 g (94 mmols) of NaOH and 2.85 g (10 mmols) of N-(4,6-dichloro-s-triazinyl-2)-2-aminobenzoic acid in 180 ml of water are reacted for 5 hours at approx. 95°–100°C, a solution of 16.96 g (48 mmols) of bisphenol A bis-chlorocarbonic acid ester in 170 ml of $CH_2Cl_2$ is allowed to run into the resulting milky turbid aqueous solution, 10.1 ml of 1% strength aqueous triethylamine solution are added and the mixture is condensed for 1 hour at pH 13. The viscous organic phase is worked up as described in Example 14.

Yield: 24.7 g (100%) of a flocculent white copolycarbonate $\eta_{rel}$ (0.5 g of product in 100 ml of $CH_2Cl_2$, 25°C): 1.372 N content: calculated 2.26%, found 2.08% COOH content: calculated 1.82%, found 1.7%.

The N-(4,6-dichloro-s-triazinyl-2)-2-aminobenzoic acid used was prepared by reaction of 36.8 g (0.2 mol) of cyanuric chloride and 27.4 g (0.2 mol) of 2-aminobenzoic acid in 520 ml of acetone at 0°–2°C in the presence of 20.3 g (0.2 mol) of triethylamine as an HCl acceptor. The reaction product obtained is washed with dilute hydrochloric acid and then with water until free of chloride and is boiled with acetone and dried.

Yield: 30.2 g (53%); melting point >330°C (decomposition) Analysis: Calculated C 42.1% H 2.11% Cl 24.95% Found 42.4% 2.19% 24.9%.

EXAMPLE 16

Copolycarbonate from bisphenol A and N-(4,6-dichloro-s-triazinyl-2)-2-aminoethanesulphonic acid (90:10 molar parts).

Analogously to Example 13, 1.84 g (10 mmols) of cyanuric chloride are reacted with 1.31 g (10.5 mmols) of 2-aminoethane-1-sulphonic acid (taurine) to give the corresponding dichloro-s-triazine, the resulting white suspension is reacted, at 60°–95°C, with 9.6 g (42 mmols) of bisphenol A while simultaneously distilling off the acetone present in the reaction mixture, giving a colorless solution, and finally the product is polycondensed with a solution of 16.96 g (48 mmols) of bisphenol A bis-chlorocarbonic acid ester in methylene chloride at pH 13 after addition of 10.1 ml of 1% strength aqueous triethylamine solution.

After stirring for a further 30 minutes, the copolycarbonate containing triazine precipitates as a jelly and is worked up as described in Example 5.

Yield: 23.8 g (97%) N content: calculated 2.27%, found 2.18%

The product is able to absorb approx. 36 times its own weight of $CH_2Cl_2$.

EXAMPLE 17

Copolycarbonate from bisphenol A and N-(4,6-dichloro-s-triazinyl-2)-5-aminoisophthalic acid (90:10 molar parts).

Analogously to Example 13, 1.84 g (10 mmols) of cyanuric chloride are first reacted with 1.9 g (10.5 mmols) of 5-aminoisophthalic acid in the presence of 1.24 g (31 mmols) of NaOH in acetone/water at 0°–5°C, the resulting light yellow suspension is condensed with 9.6 g (42 mmols) of bisphenol A at 60°–90°C for 5 hours, and finally the aqueous solution of the dihydroxy compounds is polycondensed by the phase boundary process with a solution of 16.96 g (48 mmols) of bisphenol A bis-chlorocarbonic acid ester in methylene chloride at pH 13 after addition of 10.1 ml of 1% strength aqueous triethylamine solution. After stirring for approx. 10 minutes longer, the copolycarbonate precipitates as a jelly and is worked up as described in Example 5.

Yield: 25 g (99%) of white copolycarbonate N content: calculated 2.22%, found 2.20% COOH content: calculated 3.58%, found 3.33%

The product is able to absorb approx. 19 times its own weight of $CH_2Cl_2$.

EXAMPLE 18

Copolycarbonate from bisphenol A and (4,6-dichloro-s-triazinyl-2)-hydroxyacetic acid (90:10 molar parts).

Analogously to Example 4, 9.6 g (42 mmols) of bisphenol A, 3.76 g (94 mmols) of NaOH and 2.24 g (0.01 mol) of (4,6-dichloro-s-triazinyl-2)-hydroxyacetic acid are reacted in 200 ml of water for 4 hours at 70°–80°C. After cooling to room temperature, a solution of 16.96 g (48 mmols) of bisphenol A bis-chlorocarbonic acid ester in 200 ml of $CH_2Cl_2$ is allowed to run in while stirring vigorously, 10 ml of 1% strength aqueous triethylamine solution are added and the mixture is condensed at pH 13. After stirring for a further 10 minutes, the polycarbonate containing triazine precipitates as a jelly and is worked up as described in Example 5.

Yield: 22.9 g (95%) of copolycarbonate containing triazine N content: calculated 1.74%, found 1.70% COOH content: calculated 1.87%, found 1.75%

EXAMPLE 19

Copolycarbonate from bisphenol A and S-(4,6-dichloro-s-triazinyl-2)-4-mercaptobenzoic acid (90:10 molar parts).

According to an instruction for the preparation of 2-arylthio-4,6-dichloro-s-triazines (J. Drabek and M. Skrobal, Chem. Zvesti 17, 482 [1963]), 1.84 g (0.01 mol) of cyanuric chloride and 1.54 g (0.01 mol) of 4-mercaptobenzoic acid are reacted, with addition of 0.8 g (0.02 mol) of NaOH, in acetone/water at 0°–5°C. A solution of 9.6 g (42 mmols) of bisphenol A and 3.36 g (34 mmols) of NaOH in 50 ml of water is then added to the reaction mixture and the whole is heated to 70°–80°C for 5 hours, while distilling the acetone from the mixture. After cooling to room temperature, the product is reacted, as described under Example 13, with 16.96 g (48 mmols) of bisphenol A bis-chlorocarbonic acid ester and the polycarbonate formed is worked up as described in Example 5.

Yield: 24.6 g (99%) of copolycarbonate containing triazine N content: calculated 1.69%, found 1.55%

EXAMPLE 20

Copolycarbonate from 1,1-bis-(4-hydroxyphenyl)-cyclohexane, bisphenol A and N-(4,6-dichloro-s-triazinyl-2)-p-aminobenzoic acid (42:48:10 molar parts).

Analogously to Example 15, 11.3 g (42 mmols) of 1,1-bis-(4-hydroxyphenyl)-cyclohexane are reacted with 2.85 g (10 mmols) of N-(4,6-dichloro-s-triazinyl-2)-p-aminobenzoic acid and the resulting mixture of the dihydroxy compounds is condensed with 19.96 g (48 mmols) of bisphenol A bis-chlorocarbonic acid ester. The resulting copolycarbonate is worked up as described in Example 5.

Yield: 26 g (97%) of copolycarbonate containing triazine N content: calculated 2.08%, found 2.0%

EXAMPLE 21

Copolycarbonate from 2,2-bis-(3,5-dimethyl-4-hydroxyphenyl)-propane and N-(4,6-dichloro-s-triazinyl-2)-p-aminobenzoic acid (90:10 molar parts).

Analogously to Example 15, 11.95 g (42 mmols) of 2,2-bis-(3,5-dimethyl-4-hydroxyphenyl)-propane are reacted with 2.85 g (10 mmols) of N-(4,6-dichloro-s-triazinyl-2)-p-aminobenzoic acid, a solution of 19.2 g (48 mmols) of bis-chlorocarbonic acid ester of 2,2-bis-(3,5-dimethyl-4-hydroxyphenyl)-propane in 170 ml of methylene chloride is then allowed to run in and after addition of 1.36 g (13.5 mmols) of triethylamine the mixture is stirred for a further 3 hours and then worked up as described under Example 5. Yield: 31 g (94%) of copolycarbonate containing triazine N content: calculated 1.70%, found 1.65%

EXAMPLE 22

Copolycarbonate from bisphenol A and N-(4,6-dichloro-s-triazinyl-2)-p-aminobenzamide (90:10 molar parts).

Analogously to Example 4, 9.6 g (42 mmols) of bisphenol A, 3.36 g (84 mmols) of NaOH and 2.84 g (10 mmols) of N-(4,6-dichloro-s-triazinyl-2)-p-aminobenzamide in 170 ml of $H_2O$ are reacted for 5 hours at 90°–95°C. A solution of 16.96 g (84 mmols) of bisphenol A bis-chlorocarbonic acid ester in 270 ml of $CH_2Cl_2$ is then added at 20°–25°, while stirring vigorously, and after adding 10.1 ml of 1% strength aqueous triethylamine solution the mixture is condensed for 1 hour at pH 13. The polycarbonate which precipitates as a jelly is worked up as described in Example 5.

Yield: 21.6 g (87%) of copolycarbonate N content: calculated 2.83%, found 2.75%.

The IR spectrum (KBr pressing) shows unambiguously that the material is a polycarbonate containing amide groups.

The N-(4,6-dichloro-s-triazinyl-2)-p-aminobenzamide used was prepared by reaction of 18.4 g (0.1 mol) of cyanuric chloride with 13.6 g (0.1 mol) of p-aminobenzamide in acetone/water (1:1 parts by volume), with the addition of 84. g (0.1 mol) of $NaHCO_3$, at 0°–3°C.

Yield: 51.6 (91%); melting point >300°C Cl content: calculated 25.1%, found 24.9%.

EXAMPLE 23

Copolycarbonate from bisphenol A and N-(4,6-dichloro-s-triazinyl-2)-p-aminobenzenesulphonic acid amide (90:10 molar parts).

Analogously to Example 22, 9.6 g (42 mmols) of bisphenol A are first reacted with 3.2 g (10 mmols) of N-(4,6-dichloro-s-triazinyl-2)-p-aminobenzenesulphonic acid amide, and the product is then condensed with 16.96 g (48 mmols) of bisphenol A bis-chlorocarbonic acid ester. About 20 minutes after the addition of triethylamine, the copolycarbonate containing triazine precipitates as a jelly.

Yield: 25 g (100%) N content: calculated 2.79%, found 2.7%.

The N-(4,6-dichloro-s-triazinyl-2)-p-aminobenzenesulphonic acid amide used was prepared by reaction of 18.4 g (0.1 mol) of cyanuric chloride with 17.2 g (0.1 mol) of 4-aminobenzenesulphonic acid amide in acetone/water (1:1 parts by volume), with the addition of 8.4 g (0.1 mol) of $NaHCO_3$, at 0°–3°C.

Yield: 53.5 g (84%) of a white pulverulent product Melting point: >300°C. Cl content: calculated 22.3%, found 22.1%.

EXAMPLE 24

Copolycarbonate from bisphenol A and 4,4'-bis-[4-chloro-6-diethanolamino-s-triazine-2-yl]-amino-2,2'-stilbenedisulphonic acid (99:1 molar parts).

Analogously to Example 4, 22.6 g (99 mmols) of bisphenol A, 7.92 g (198 mmols) of NaOH and 847 mg (1 mmol) of the di-Na salt of 4,4'-bis-[4-chloro-6-diethanolamino-s-triazine-2-yl]-amino-2,2'-stilbenedisulphonic acid in 175 ml of $H_2O$ are heated to 90°–95°C for 5 hours. The mixture is then cooled to 20°C and after adding 450 mg (3 mmols) of p-tert.-butylphenol and 175 ml of $CH_2Cl_2$ the mixture is reacted with 14.9 g (0.15 mol) of $COCl_2$ at pH 12, with vigorous stirring. 10.1 ml of 1% strength aqueous triethylamine solution are then added and the mixture is stirred for a further hour at pH 12. After acidifying with dilute $H_3PO_4$, the aqueous phase is separated off and the organic phase is added dropwise to methanol, whereupon the polycarbonate precipitates.

Yield: 24.3 g (94%) $\eta_{rel}$ (0.5 g of product in 100 ml of $CH_2Cl_2$, 25°C): 1.245 N content: calculated 0.54%, found 0.53%.

On irradiation with UV light, the product shows a blue fluorescence.

EXAMPLE 25

Copolycarbonate from bisphenol A and 4,4'-bis-[4-chloro-6-diethanolamino-s-triazine-2-yl]-amino-2,2'-stilbenedisulphonic acid (90:10 molar parts).

Analogously to Example 24, 20.5 g (0.09 mol) of bisphenol A and 8.47 g (0.01 mol) of 4,4'-bis-[4-chloro-6-diethanolamino-s-triazine-2-yl]-amino-2,2'-stilbenedisulphonic acid are reacted, with the addition of 7.2 g (0.18 mol) of NaOH in 210 ml of $H_2O$, 210 ml of $CH_2Cl_2$ and 0.75 g (5 mmols) of p-tert.-butylphenol are then added at room temperature and the mixture is then phosgenated with 11.9 g (0.12 mol) of $COCl_2$. After adding 10.1 ml of 1% strength aqueous triethylamine solution, the mixture is stirred for a further hour at pH 12.5. After acidification, the polycarbonate, in which the entire methylene chloride is absorbed, precipitates as a gritty product. After 24 hours' drying at 80°C/15 mm Hg, 30 g (99%) of copolycarbonate are left. N content: calculated 4.61%, found 4.4%

EXAMPLE 26

Copolycarbonate from bisphenol A and 4,4'-bis-[4-chloro-6-anilino-s-triazine-2-yl]-amino-2,2'-stilbenedisulphonic acid (99:1 molar parts).

Analogously to Example 24, 22.6 g (99 mmols) of bisphenol A and 0.824 g (1 mmol) of the di-Na salt of 4,4'-bis-[4-chloro-6-anilino-s-triaine-2-yl]-amino-2,2'-stilbenedisulphonic acid are reacted in the presence of 7.92 g (198 mmols) of NaOH in 175 ml of water, the product is phosgenated at room temperature with 14.9 g (0.15 mol) of $COCl_2$ at pH 13 after addition of 175 ml of $CH_2Cl_2$ and 0.45 g (3 mmols) of p-tert.-butylphenol and after addition of triethylamine (10.1 ml of a 1% strength aqueous solution) the mixture is stirred for a further hour. After acidification, the mixture is washed with distilled water and the organic phase is added dropwise to methanol, whereupon the polycarbonate precipitates as a white flocculent material.

Yield: 23.8 g (92%) $\eta_{rel}$ (0.5 g of product in 100 ml of $CH_2Cl_2$, 25°C): 1.287 N content: calculated 0.54%, found 0.49%.

On irradiation with UV light, the product shows a green-blue fluorescence.

Any of the other bis-hydroxy compounds and particularly the bis(hydroxyaryl)alkanes, and s-triazine compounds disclosed as suitable herein may be used to prepare the novel polycarbonates in accordance with the foregoing working examples.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A polycarbonate consisting essentially of structural units of the following formulae 3 and/or 4:

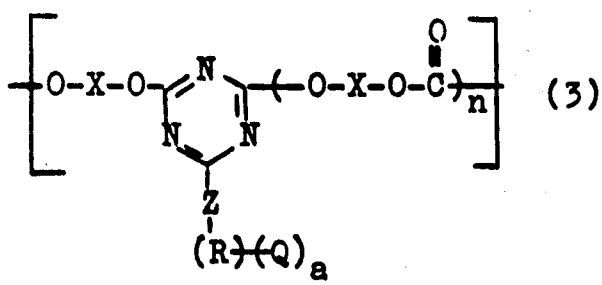

in which
Z represents -O-, -S-, -NH- or -NR$^1$- or

R and R* are identical or not identical and denote alkylene radicals with 1–20 carbon atoms, cycloalkylene radicals with 5–12 carbon atoms, mononuclear or polynuclear arylene radicals, or heteroarylene radicals bonded via carbon, with up to 14 carbon atoms, monosubstituted or polysubstituted mononuclear or polynuclear arylene radicals, or heteroarylene radicals bonded via carbon, with up to 14 ring carbon atoms and substituted with alkyl, alkoxy or alkylmercapto groups with 1–4 carbon atoms, halogen atoms, -NO$_2$ or -CN, alkylarylene radicals with a total of up to 30 carbon atoms or aralkylene radicals with a total of up to 30 carbon atoms, R$^1$ denotes alkyl radicals with 1 to 20 carbon atoms, cycloalkyl radicals with 5 to 12 carbon atoms, mononuclear or polynuclear aryl radicals, or heteroaryl radicals bonded via carbon, with up to 14 ring carbon atoms, unsubstituted or substituted with alkyl, alkoxy or alkylmercapto groups with 1 to 4 carbon atoms, halogen atoms, -NO$_2$ or -CN, alkylaryl radicals with a total of up to 30 carbon atoms, aralkyl radicals with a total of up to 30 carbon atoms or hydroxyalkyl radicals with 1 to 10 carbon atoms, Q and Q* are identical or not identical and denote a -COOH, -COOR$^2$, -CONR$^3$R$^4$, -SO$_3$H, -SO$_2$NR$^3$R$^4$ or aliphatic OH group, R$^2$ represents alkyl groups with 1–4 carbon atoms, R$^3$ and R$^4$ independently of one another represent hydrogen, straight-chain or branched alkyl groups with 1–4 carbon atoms or an unsubstituted, monosubstituted or polysubstituted phenyl radical or conjointly with the N atom form a 5-membered or 6-membered ring system and a and a* are identical or not identical and denote an integer of from 1 to 4 inclusive, R$^5$ and R$^6$ independently of one another represent H or alkyl, hydroxyalkyl, carboxyalkyl or alkoxycarbonyl-alkyl groups containing 1–5 carbon atoms, $C_5$-$C_7$- cycloalkyl groups or $C_6$-$C_{14}$- aryl groups or conjointly with the N atom form a 5-membered or 6-membered ring system, X denotes an o-, m- or p-phenylene radical or an o-, m- or p-phenylene radical, monosubstituted or polysubstituted with alkyl groups having 1–4 carbon atoms or halogen atoms or denotes a radical characterized by the formula 5

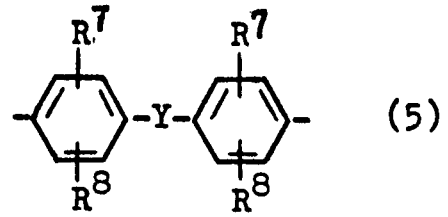

in which
R$^7$ and R$^8$ represent hydrogen atoms, alkyl radicals with 1–4 carbon atoms or halogen atoms and have identical or different meanings, and Y denotes a single bond, an alkylene or alkylidene radical with 1–7 carbon atoms, a cycloalkylene or cycloalkylidene radical with 5 to 12 carbon atoms, -O-, -S-, -CO-, -SO-, -SO$_2$- or a radical of the formula 6a or 6b

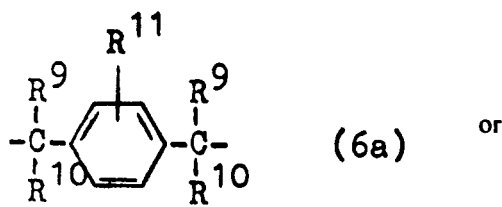 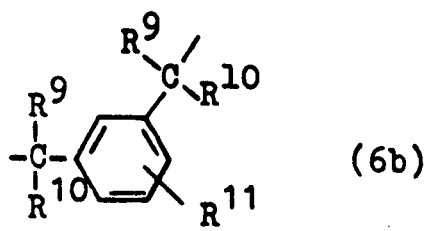

wherein
R$^9$ to R$^{11}$ denote alkyl radicals with 1–4 carbon atoms and
R$^{11}$ can also represent hydrogen or halogen atoms, and
n is an integer between 1 and 200.

2. A polycarbonate consisting essentially of structural units of the following formulae 3 and/or 4:

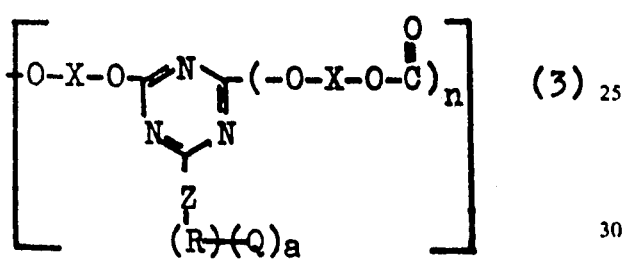

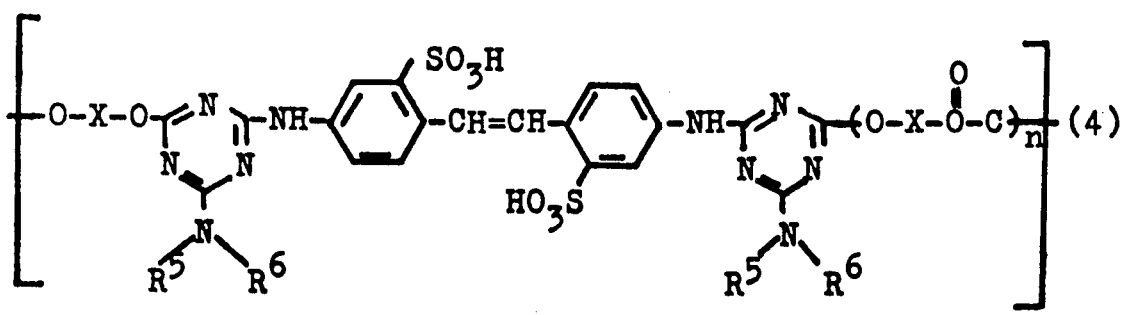

which are branched through structural units of the formula 18

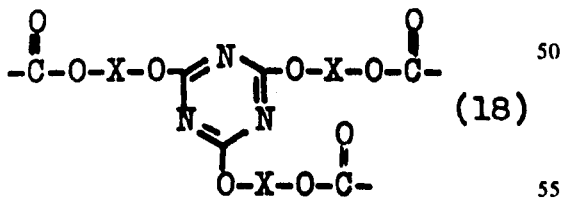

in which X, Z, R, Q, a, R$^5$, R$^6$ and n have the same meaning as in claim 1 and the said structural units of formula (18) are present in amounts of 0.01 to 5 mol %, based on the structural units 3 and/or 4, in the complete molecule.

3. Polycarbonates according to claim 1 characterized in that
X denotes a radical characterized by the formula 5 in which
R$^7$ and R$^8$ have the same meaning as in claim 1 and Y is an alkylene or alkylidene radical with 1–7 carbon atoms or a cycloalkylene or cycloalkylidene radical with 5–12 carbon atoms.

4. Polycarbonates according to claim 3, characterized in that

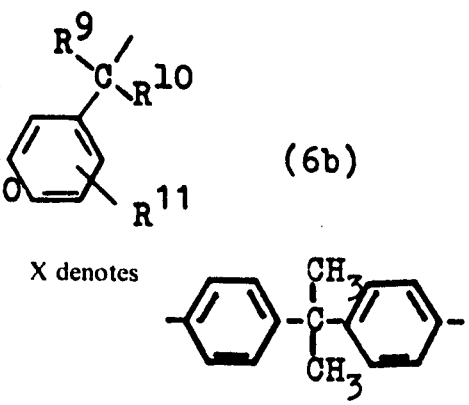

X denotes

5. A process for the preparation of polycarbonates containing s-triazine rings, comprising reacting according to the methods for preparation of polycarbonates, aromatic bis-hydroxy compounds containing s-triazine rings, of the formula 11

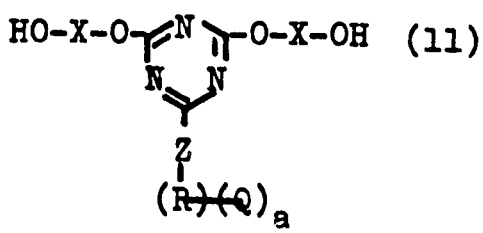

in which formula
Z, R, Q, a and X have the same meaning as in claim 1, by themselves or mixed with up to 199 equivalents of a dihydroxy compound of the formula 10,

HO-X-OH (10)

in which
X has the same meaning as in claim 1, with phosgene and/or a bis-chlorocarbonic acid ester of a dihydroxy compound of formula 10 or an oligomeric carbonate, containing chlorocarbonic acid ester end groups, obtainable from a compound of formula 10, the sum of the equivalents of the dihydroxy compound of formula 10, employed as such or as its alkali metal salts or as its bis-chlorocarbonic acid ester or as oligomeric carbonates, containing chlorocarbonic acid ester end groups, prepared from the dihydroxy compound of formula 10, not exceeding 199 equivalents per equivalent of the compound 11 and at least 1.05 chlorine equivalents bonded via -CO- being employed per phenolic OH equivalent.

6. The process according to claim 5 wherein the bis-hydroxy compounds 11 are produced by reaction of dihalogeno-s-triazines of the formula 8 with aromatic dihydroxy compounds of the formula 10 in the presence of a proton acceptor, without separate isolation and in the same reaction vessel as the reaction of compounds 11 either by themselves or mixed with an additional compound of formula 10 depending on the choice of the molar ratio of 8 to 10 used in the preparation of compound 11, with phosgene or bis-chlorocarbonic acid esters of the aromatic dihydroxy compounds 10 or oligomeric carbonates, containing chlorocarbonic acid ester end groups, obtainable from the compound of formula 10, the sum of the equivalents of the dihydroxy compound of formula 10, employed as such or as its alkali metal salts or as its bis-chlorocarbonic acid ester or as oligomeric carbonates, containing chlorocarbonic acid ester end groups, prepared from the dihydroxy compound of formula 10, not exceeding 199 equivalents per equivalent of the compound 11, and at least 1.05 chlorine equivalents bonded via -CO- having to be employed per phenolic OH equivalent.

7. A process for the preparation of polycarbonates containing bis-triazinyl structural units, comprising reacting according to the methods for preparation of polycarbonates, aromatic bis-hydroxy compounds containing bis-triazinyl segments, of the formula 12

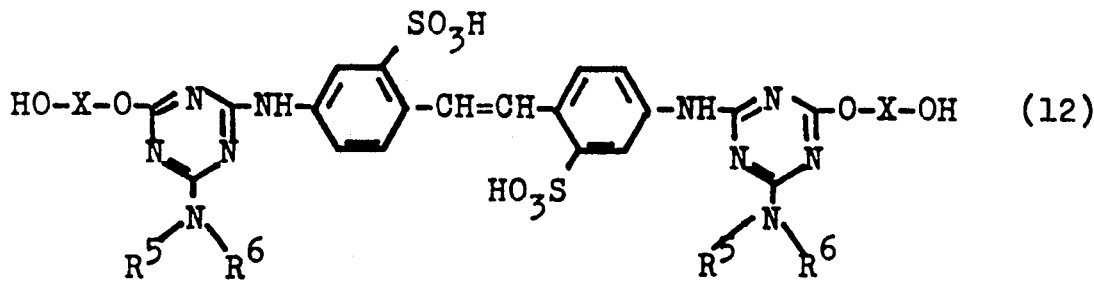

in which formula
R⁵, R⁶ and X have the same meaning as in claim 1, by themselves or mixed with up to 199 equivalents of a dihydroxy compound of the formula 10,

HO-X-OH    (10)

in which
X has the same meaning as in claim 1, with phosgene or a bis-chlorocarbonic acid ester of a dihydroxy compound 10 or an oligomeric carbonate, containing chlorocarbonic acid ester end groups, obtainable from the compound of formula 10, the sum of the equivalents of the dihydroxy compound of formula 10, employed as such or as its alkali metal salts or as its bis-chlorocarbonic acid ester or as oligomeric carbonates, containing chlorocarbonic acid ester end groups, prepared from the dihydroxy compound of formula 10, not exceeding 199 equivalents per equivalent of the compound 12, and at least 1.05 chlorine equivalents bonded via -CO- having to be employed per phenolic OH equivalent.

8. The process according to claim 7 wherein the dihalogeno-bis-triazinyl compounds of formula 9, obtained by reaction of aminodichloro-triazine compounds of formula 15

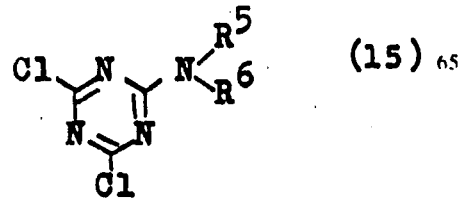

in which R⁵ and R⁶ have the same meaning as in claim 1 with 4,4'-diaminostilbene-2,2'-disulphonic acid or its salts, are reacted, without separate isolation and in the same reaction vessel, with aromatic dihydroxy compounds of the formula 10, in the presence of a proton acceptor to a compound of the formula 12, and thereafter, depending on the choice of the molar ratio used in the reaction of 9 with 10, the compound of formula 12 is reacted either by itself or mixed with further compound of formula 10, with phosgene or bis-chlorocarbonic acid esters of the aromatic dihydroxy compounds 10 or oligomeric carbonates containing chlorocarbonic acid ester end groups, obtainable from a compound of formula 10.

9. The process according to claim 7, characterized in that the bis-hydroxy compound of formula 12 containing bis-triazinyl segments are obtained by reaction of dichloro-bis-triazinyl compounds of the formula 9 with aromatic dihydroxy compounds of the formula 10 in the presence of a proton acceptor without separate isolation and in the same reaction vessel as the reaction of compounds 12 either by themselves or mixed with additional compound of formula 10 depending on the choice of the molar ratio of 9 to 10 used in the preparation of compound 11, with phosgene or bis-chlorocarbonic acid esters of the aromatic dihydroxy compounds 10 or oligomeric carbonates, containing chlorocarbonic acid ester end groups, obtainable from a compound of formula 10, the sum of the equivalents of the dihydroxy compound of formula 10, employed as such or as its alkali metal salt or as its bis-chlorocarbonic acid ester or as oligomeric carbonate, containing chlorocarbonic acid ester end groups, prepared from the dihydroxy compound of formula 10, not exceeding 199 equivalents per equivalent of the compound of formula 12, and at least 1.05 chlorine equivalents bonded via -CO- having to be employed per phenolic OH equivalents.

10. The process of claim 9 wherein 0.01 to 5 mol percent based on the ultimate polycarbonate of the tris-hydroxy compound of formula 14,

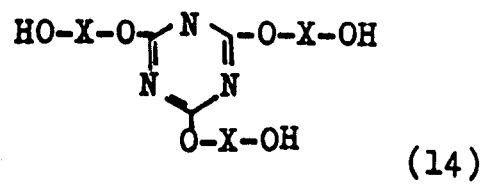

in which X has the same meaning as in claim 1 are reacted with bis-hydroxy compounds of formula 12.

11. The process of claim 6 wherein X is derived from aromatic di-hydroxy compounds of the formula 20,

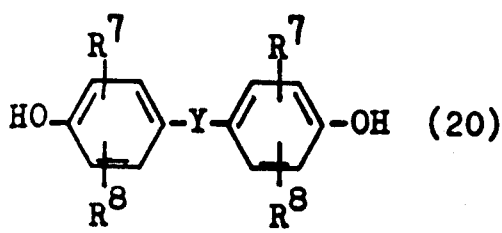

in which $R^7$, $R^8$ and Y have the same meaning as in claim 1.

12. The process of claim 11 wherein X is derived from 2,2-bis-(4-hydroxyphenyl)propane.

13. The process of claim 9 wherein X is derived from aromatic dihydroxy compounds of the formula 20,

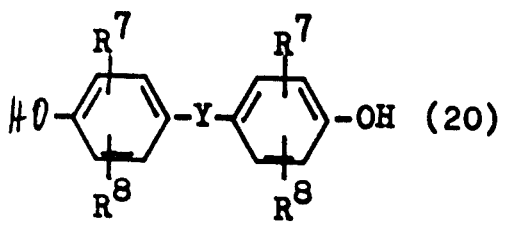

in which $R^7$, $R^8$ and Y have the same meaning as in claim 1.

14. The process of claim 13 wherein X is derived from 2,2-bis-(4-hydroxyphenyl)propane.

15. The process of claim 5 wherein the compounds of formula 11 are prepared by reacting a dihalogeno s-triazine of formula 8

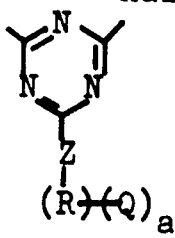

in which Z, R, Q, a and X have the same meaning as in claim 1 and Hal denotes, F, Cl, Br or I with two equivalents of an aromatic dihydroxy compound of formula 10

HO-X-OH (10)

in which X has the same meaning as in claim 1, in the presence of a proton acceptor.

16. The process of claim 7 wherein the compounds of formula 12 are obtained by reaction of dichloro-bis-triazinyl compounds of the formula 9

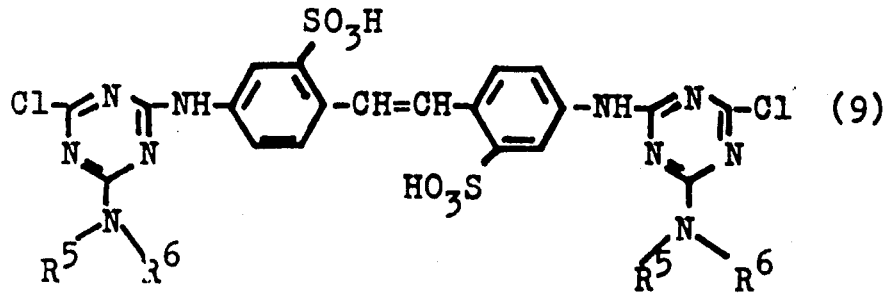

in which $R^5$ and $R^6$ have the same meaning as in claim 1 with two equivalents of an aromatic dihydroxy compound of the formula 10, HO-X-OH
(10)

in which X has the same meaning as in claim 1, in the presence of a proton acceptor.

17. The process of claim 6 wherein 0.01 to 5 mol percent based on the ultimate polycarbonate of the tris-hydroxy compound of the formula 14

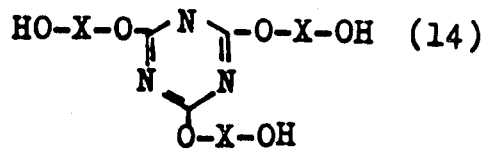

in which X has the same meaning as in claim 1 are reacted with the bis-hydroxy compounds of formula 11.

18. Polycarbonates containing s-triazine rings, obtained according to the processes of claims 4 and 5.

19. The product of the process of claim 6.
20. The product of the process of claim 9.
21. The product of the process of claim 7.
22. The polycarbonates of claim 2 wherein X is derived from aromatic dihydroxy compounds of the formula 20,

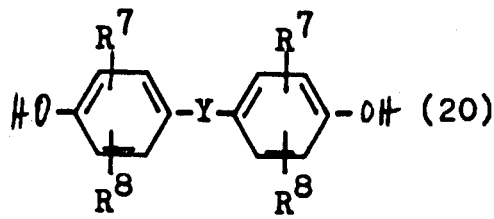

in which $R^7$, $R^8$ and Y have the same meaning as in claim 1.

23. The polycarbonates of claim 22 wherein X is derived from 2,2-bis-(4-hydroxyphenyl)propane.

24. Process according to claim 5 characterized in that the dihalogeno-s-triazines of the formula 8, obtained by reaction of trihalogeno-s-triazines of the formula 19,

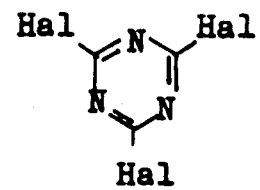

in which
Hal denotes F, Cl, Br and I with compounds of the formula 13

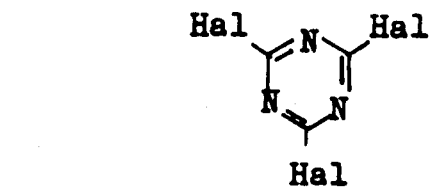

in which
Z, R, Q and a have the same meaning as in claim 1, in the molar ratio of 1:1, are reacted, without separate isolation and in the same reaction vessel, with aromatic dihydroxy compounds of the formula 10 in the presence of a proton acceptor to form a compound of the formula 11, and thereafter, depending on the choice of the molar ratio used in the reaction of 8 with 10, the compound of formula 11 is reacted either by itself or mixed with further compound of formula 10, with phosgene or bischlorocarbonic acid esters of the aromatic dihydroxy compounds 10 or oligomeric carbonates, containing chlorocarbonic acid ester end groups, obtainable from a compound of formula 10.

* * * * *